United States Patent Office 3,318,300
Patented May 9, 1967

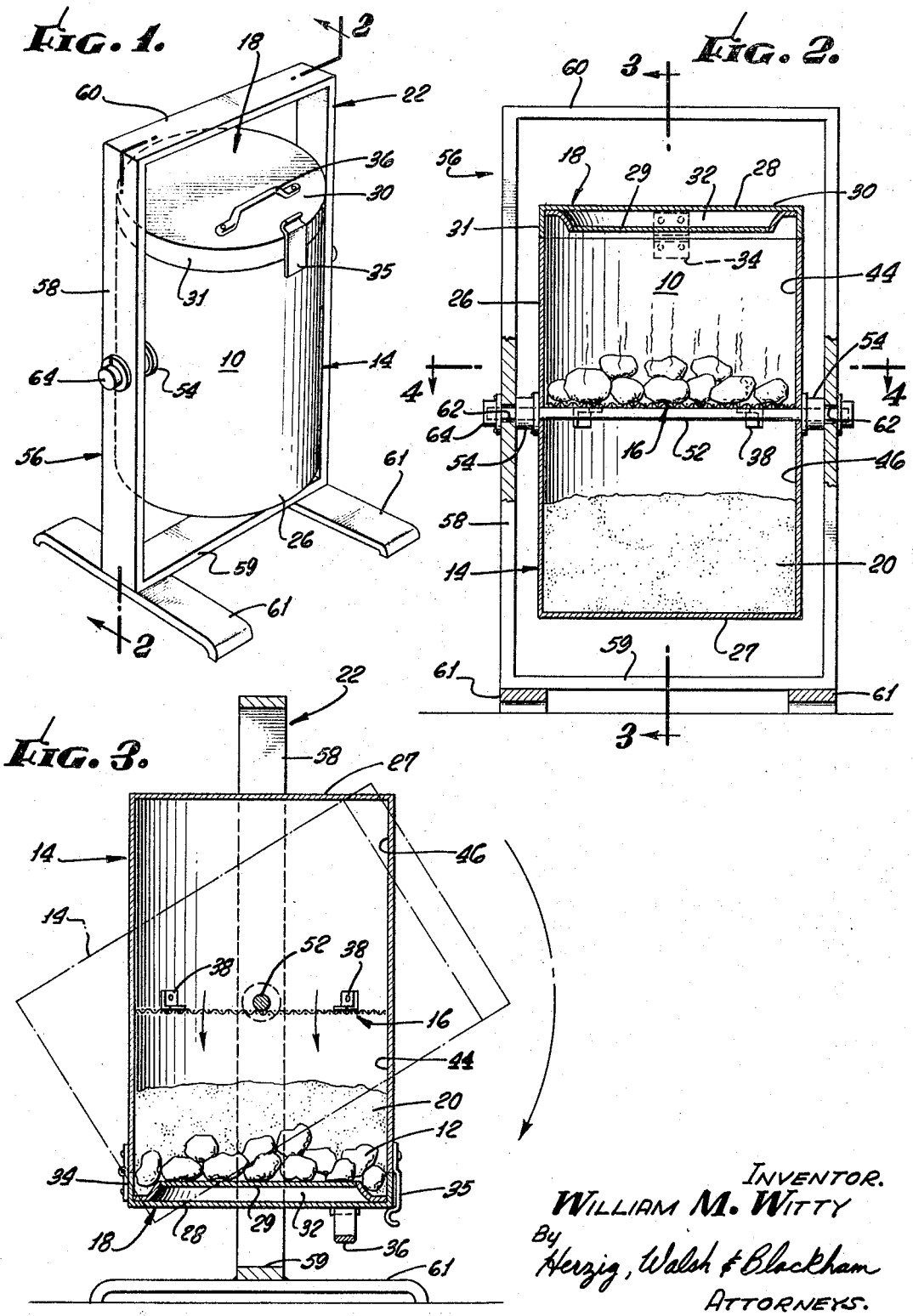

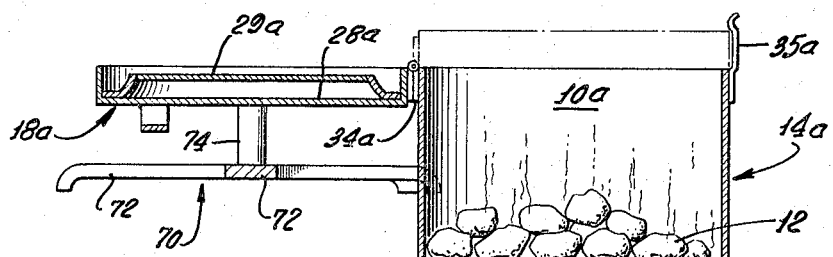
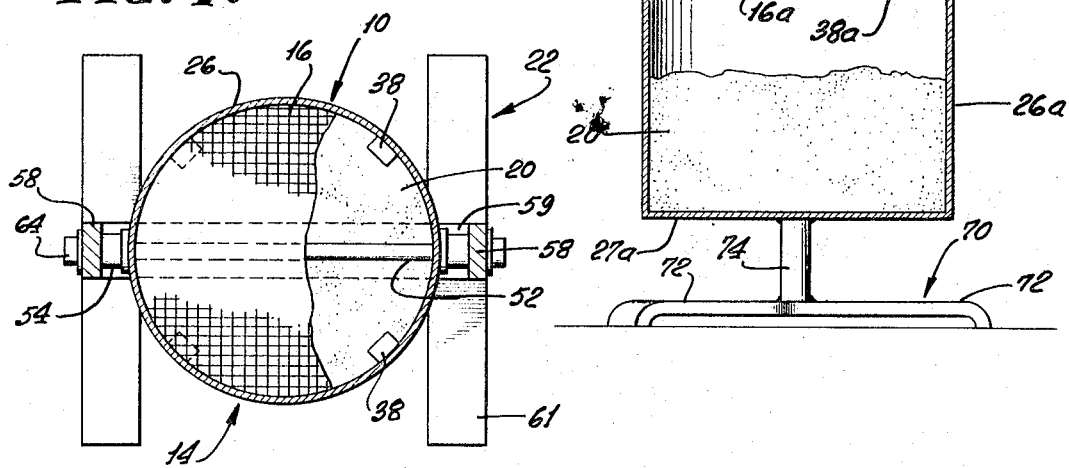
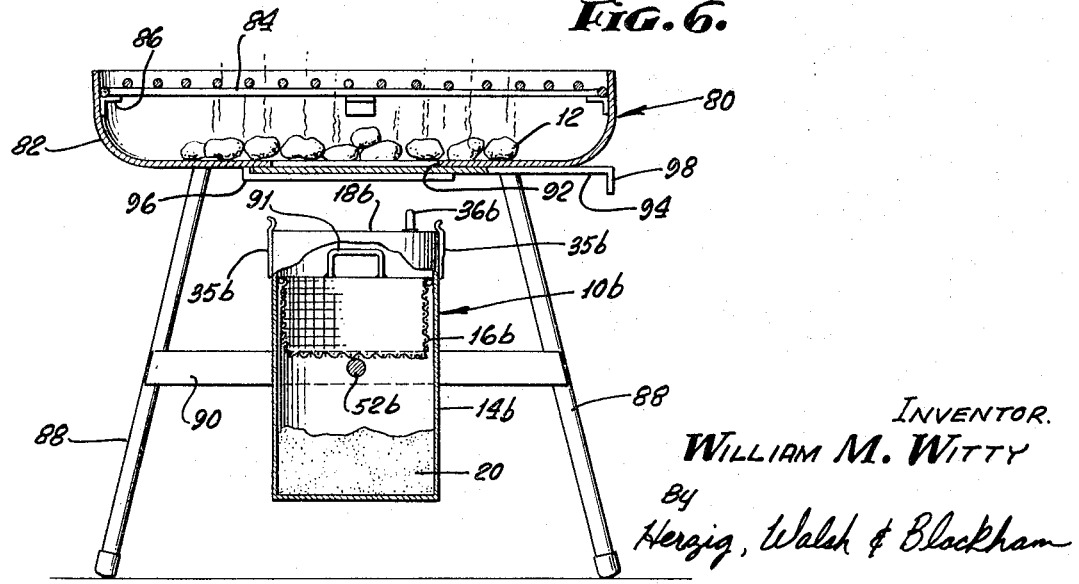

3,318,300
EXTINGUISHING APPARATUS AND METHOD
William M. Witty, 25854 E. 27th St.,
San Bernardino, Calif. 92404
Filed Oct. 6, 1965, Ser. No. 493,389
12 Claims. (Cl. 126—25)

The present invention relates to extinguishing or stopping further combustion of burning but only partially consumed fuel such as charcoal so that the fuel may be reused at a later time.

For cooking over charcoal or the like it is desirable that the bed of coals or briquettes are kept very hot until all of the food has been cooked so that the food can be made deeply browned or charcoaled on its outside and rare or medium in the center. Since the bed of coals must be kept hot through the entire cooking period, after the cooking is completed the charcoal will only be partially consumed and it can be reused at a later time if its combustion can be conveniently stopped. Often in the past, because of the problems involved with prior apparatus and methods for attempting to extinguish the partially consumed charcoal, the charcoal was merely allowed to burn itself out. This is, of course, wasteful of fuel.

One common method of stopping the combustion of the charcoal was to pour water over the coals from a bucket or a hose, or to submerge the coals in water, however, this tended to rust equipment and to create a substantial mess by forming a paste from the ashes and small bits from the charcoal. It also tended to leave the coals dirty and coated, making them less desirable for subsequent use. This and other methods and/or apparatus have not proved satisfactory, convenient, or practical.

In general, the present invention contemplates extinguishing burning but only partially consumed pieces of charcoal or the like by enclosing them in a closed container and submerging them in a granular material such as sand for a period of time until further combustion of the charcoal is substantially stopped. Then the charcoal pieces are separated from the granular material for subsequent reuse.

A principal object of the present invention is to provide novel and improved apparatus and method for stopping further combustion of burning but only partially consumed pieces of charcoal or the like.

Another object of the present invention is to extinguish the charcoal in such a manner that it is directly reusable.

It is a further object of the present invention to provide such extinguishing apparatus in combination with a cooking unit.

Still another object of the present invention is to provide a simple and inexpensive yet durable extinguishing apparatus.

Various other objects and advantages of the present invention will become more apparent from the following description and the associated drawings, wherein:

FIGURE 1 is a perspective view of a self-standing portable extinguishing apparatus for stopping further combusion of burning but only partially consumed pieces of charcoal or the like, said apparatus embodying various features of the present invention, and being a preferred form thereof;

FIGURE 2 is an enlarged elevational sectional view taken generally along line 2—2 of FIGURE 1;

FIGURE 3 is an elevational sectional view taken generally along line 3—3 of FIGURE 2, but with the container of the apparatus in an inverted position, and also showing in broken outline a partially inverted position of the container;

FIGURE 4 is a plan sectional view taken generally along line 4—4 of FIGURE 2;

FIGURE 5 is a side sectional view of a modified form of extinguishing apparatus; and FIGURE 6 is a side sectional view of another modified form of extinguishing apparatus incorporated into a cooking unit.

Briefly, the illustrated apparatus 10 for stopping further combustion of burning but only partially consumed pieces 12 of charcoal or the like includes a closed imperforate container 14. Separating means in the form of a screen 16 extends transversely across the inside of the container intermediate its height to support the pieces of charcoal, and the container is provided with a latchable cover 18 affording access to the upper portion of the container above the screen. A quantity of granular extinguishing material 20 such as sand is provided in the lower portion of the container below the screen. The container 14 is pivotally supported on a self-standing frame means 22 so that the container can be readily inverted or turned upside down. When the container 14 is so inverted, the sand 20 passes through the screen 16, engulfs the pieces of charcoal, and in a short time extinguishes them. When the container is returned to its upright position the mixture of charcoal pieces and sand is agitated and tumbled to clean and scale the charcoal pieces so that they are ready for direct use. With the container again upright, the screen supports the usable pieces of charcoal while the sand, together with ashes and small particles of debris and charcoal, falls through the screen to effectively and automatically separate the sand from the pieces of charcoal. The cover 18 is then opened and the pieces of charcoal may be removed from the container for reuse at a subsequent time. The operation is exceedingly simple and there is no mess or dirt to clean up.

Now considering the self-standing portable extinguishing apparatus 10 more particularly, the box or container 14 is shown in FIGURES 1 and 2 in its upright position and the apparatus will be described in this orientation for convenience. As noted above, the container is inverted incident to its operation to the position shown in FIGURE 3.

The container 14 has the general shape of an upright cylinder including a circular cylindrical tubular side wall 26. The lower end of the container is closed by circular lower wall 27. The upper end or inlet to the container is open and provided with the cover 18. The cover 18 is formed from two parts: an outer part 28 and an inner part 29. The outer part 28 has a circular center section 30 and a right angle annular flange section 31. The inner part 29 is generally shaped like a flat circular upright pie pan. The parts 28 and 29 are secured together around their periphery by suitable means such as bolting, riveting or welding, and they are spaced apart from each other in the center to provide an insulating air space 32. The cover 18 is mounted to the upper edge of the side wall 26 at one side of the container as by means of a hinge 34 for pivoting between open and closed positions. Means for releasably latching the cover 18 in its closed position is provided by a resilient latch bar 35 secured as by means of screws to the side wall 26 adjacent the upper edge of the wall opposite the hinge 34. The cover 18 may be readily released and opened to afford access to the inside of the container. When the cover is closed and the latch bar is in position, the container is completely closed and will remain so even when the container is inverted. The cover 18 is provided on its upper surface with a handle 36 for manually grasping to open the cover.

The container 14 may be constructed of any suitable non-flammable, heat-resistant, durable and imperforate or impervious material such as metal. A suitable heat and rust resistant paint or coating may be applied to the container to make it resistant to weather conditions.

The separating means of the apparatus 10 comprises a perforated separator that is provided by the screen 16. The illustrated screen 16 is a heavy duty wire mesh of circular configuration supported generally horizontally and intermediately the height of the container. The screen 16 supports the pieces of charcoal and therefore should be sufficiently heavy duty and durable for that purpose. The screen 16 is supported in position by four circumferentially spaced L-brackets 38 that each have one leg secured to the inside of the side wall 26 and have the other leg extending inwardly. The screen 16 may be permanently secured to the inwardly extending legs of the brackets or it may be releasably held in position so that the screen may be removed from the container when desired for purposes of cleaning or the like. It is preferable, whatever means of support is used, that the screen is held in its position incident to the operation of the extinguisher. Movement of the screen within limits is permissible, however, so long as the pieces of charcoal are retained at one side of the screen.

The screen 16 thus divides the interior of the container 14 into an upper or first area or compartment 44 above the screen and a lower or second area or compartment 46 below the screen. By varying the height or disposition of the screen the size and/or shape of the compartments 44 and 46 may be varied. The screen may be disposed at any convenient height either above, below, or at the center of the container, so long as there is sufficient space provided above and below the screen for the purpose to be explained more fully below.

In addition to being sufficiently strong to support the weight of the pieces of charcoal, the screen is so perforated or provided with openings that it will permit granular material such as sand to pass freely through the openings while it will prevent the larger usable pieces of charcoal from passing through the openings. While pieces of charcoal become smaller as they are consumed and through breaking and chipping incident to their use and handling, for the most part, the pieces of charcoal are substantially larger in size than the grains or granules of sand or similar material. Also, inasmuch as the purpose of the apparatus 10 is to reclaim usable pieces of charcoal, it is desirable that the openings through the screen be sufficiently large so that very small fragments and particles of the charcoal pass through and leave only the usable larger pieces of charcoal suspended on the screen. In this connection, the pieces of chacoal are exposed to a scouring or cleaning action by the grains of sand and the small particles of charcoal, ash, and other debris separated from the charcoal will also pass through the screen with the sand.

The construction of the perforated separator may vary considerably, as for example, instead of a wire mesh construction it may be a solid plate provided with suitable openings or perforations. Effective results have been achieved using a heavy durable wire mesh screen designated 3.4 pounds metal lath made from metal strands having about a $3/32$ inch diameter and forming openings in the nature of from about $1/4$ to about $1/2$ inch across. The screen 16 may be removable, as noted above, so that the bottom portion of the container may periodically be cleaned.

A shaft 52 extends across a diameter of the container generally intermediate its height and just below the screen 16. The ends of the shaft 52 extend outwardly of either side of the container through opposed openings in the side wall 26 and through spacer sleeves 54 secured to the outside of the wall 26 in alignment with the opposed openings. The ends of the shaft 52 extend outwardly of the respective sleeves 54 and are rotatably supported on the frame means 22, as will be explained, to support the container on the frame means.

The frame means 22 includes an upright open rectangular box frame 56 constructed of flat bar stock. The frame 56 includes a spaced pair of upwardly extending vertical posts 58, a lower horizontally extending base section 59 connected between the lower ends of the posts 58, and an upper horizontally extending handle section 60 connected between the upper ends of the posts 58. Two spaced, parallel, horizontally-extending base bars 61 are secured, as by welding, to the underside of the base section 59 to make the frame self-standing.

A bearing aperture 62 is provided in each post 58 intermediate its height for rotatably receiving therethrough one end of the shaft 52, to thereby rotatably support the container on the frame. A cap 64 is secured to the outside of each post 58 over the end of the shaft 52 that extends through that post. The container 14 is supported within the frame 56 at a sufficient elevation above the base section 59 so that the container may be freely rotated about the horizontal axis of the shaft 52 between its upright and inverted positions. The handle section 60 of the frame may be grasped to manually carry the apparatus from place to place.

OPERATION

Now the operation of the apparatus 10 may be readily understood. With the cover 18 open, a quantity of burning but partially consumed pieces 12 of charcoal or the like may be placed on the screen 16 and the cover closed. Then, the container 14 is inverted by rotating it about the shaft 52 from its upright position shown in FIGURES 1 and 2 to its inverted position shown in solid line in FIGURE 3. As shown in FIGURE 3, the pieces of charcoal fall onto the underside of the cover 18 and the sand 20 passes through the screen 16 and covers or engulfs the pieces of charcoal to stop their further combustion. The latch bar 35 holds the cover 18 closed against the weight of the charcoal pieces and the sand. After from about 7 to about 10 minutes substantially all combustion will be stopped for a quantity of charcoal pieces such as would normally be used for a backyard barbeque. It will be noted that the air spaced 32 of the cover 18 prevents the outside of the container from becoming excessively hot.

Then the container is inverted to its upright position as shown in FIGURES 1 and 2, which agitates or tumbles the mixture of sand and extinguished charcoal pieces and then places it on the screen 16. While the usable pieces of charcoal remain supported on the screen, the sand as well as dirt and particles of charcoal flow through the screen to the lower part of the container. The cover may be opened and the pieces of charcoal removed for later use. Thus, fuel is conserved in directly usable form, simply and inexpensively and without the creation of a mess.

FIGURE 5 illustrates a modified form of apparatus 10a having generally corresponding elements designated by the same number with an "a" suffix. The container 14a of apparatus 10a is essentially like container 14, however, instead of being pivotally supported on a frame, it is provided with a support stand 70 at either end, top and bottom, so that the entire apparatus can be manually inverted and will be self-standing in either right side up or upside down condition. In apparatus 10a, each support stand 70 includes a central vertical post 74 and three radially outwardly extending legs or base bars 72 secured to the outer end of the post 74. The posts 74 which may be suitably formed and insulated to provide handles to be grasped in manually inverting the apparatus 10a.

In FIGURE 6, another modified form of apparatus 10b is shown. The apparatus 10b has some corresponding elements designated by the same number with a "b" suffix. This apparatus 10b combines extinguishing means with a charcoal cooking unit 80. The cooking unit 80 has a charcoal-holding bowl 82 over which a food-supporting grating 84 is removably supported on brackets 86 secured to the bowl. The bowl 82 is supported on the upper ends of three legs or posts 88. The legs 88 have a circular, horizontally-extending support frame 90 secured to them intermediate their height. The frame 90 is provided with bearing apertures (not shown) in which the outer ends of a shaft 52b are journaled for rotatively supporting a container 14b. The container 14b is provided with separating means which is in the form of a screen basket 16b removable from the container to transport extinguished pieces of charcoal from the container back to the bowl 82. The screen basket 16b has suitable carrying handles 91. The cover 18b of the container 14b is not hinged but is releasably held in position by an opposed pair of resilient latch bars 35b. An outlet or exit opening 92 is provided in the lower portion of the bowl 82 and a door 94 is movably supported beneath the opening 92. The door 94 is slidably supported by suitable side guides 96 and is provided with a pull-handle 98. The opening 92 is disposed above the upper end of the container so that when the container is open, the door 94 may be slid away from the opening 92 and the burning but only partially consumed pieces of charcoal will fall into the container and be retained in the screen basket 16b. The container 14b is then closed and inverted as noted above to extinguish the burning charcoal. The handles 91 facilitate removing the screen basket 16b with the extinguished charcoal pieces from the container and returning the charcoal to the bowl or to storage.

Thus, the illustrated forms of the apparatus provide economical and neat, yet quick and effective, extinguishing. There is no mess because the sand is always retained within the container, as are the ashes and small particles from the charcoal. The charcoal is not only extinguished, but is also cleaned and scaled by the scouring action of the sand so that the resultant charcoal pieces are relatively clean and ready for direct reuse. Further, the sand and the extinguished charcoal pieces are automatically separated by the screen when the container is inverted. Further, the illustrated apparatus is constructed to avoid excessive external temperatures.

Various modifications and changes may be made in the illustrated structure and method without departing from the spirit and scope of the present invention.

Various features of the present invention are set forth in the following claims.

What is claimed is:

1. Apparatus for extinguishing burning but only partially consumed pieces of charcoal, said apparatus comprising a closed container having a first area for pieces of charcoal and a second area for granular extinguishing material, means defining an excess door to said first area for inserting and removing the pieces of charcoal, means defining a perforated separator between said first area and said second area for retaining the pieces of charcoal in said first area, and a quantity of granular non-flammable extinguishing material normally disposed in said second area and comprised of grains sufficiently small to pass through said perforated separator, whereby the charcoal is extinguished by reorienting the container so that the granular material passes through the separator into the first area, and the charcoal and the granular material are separated by again reorienting the container so that the granular material passes through the separator into the second area.

2. Apparatus for extinguishing burning but only partially consumed pieces of charcoal, said apparatus comprising a closed container having a first area for pieces of charcoal and a second area for granular extinguishing material, means defining an access door to said first area for inserting and removing the pieces of charcoal, means defining a perforated separator between said first area and said second area for retaining the pieces of charcoal in said first area, a quantity of granular non-flammable extinguishing material normally disposed in said second area and comprised of grains sufficiently small to pass through said perforated separator, and frame means supporting said container for movement between a first position where said first area is generally above said second area and a second position where said second area is at least as high as said first area, whereby the charcoal is extinguished by orienting the container to the second position where the granular material passes through the separator into the first area, and the charcoal and the granular material are separated by reorienting the container to the first position where the granular material passes through the separator into the second area.

3. An apparatus for extinguishing burning but only partially consumed pieces of charcoal and the like, said apparatus comprising a closed container having an upper area for pieces of charcoal and a lower area disposed generally below said upper area for granular extinguishing material, means defining an access door to said upper area for inserting and removing the pieces of charcoal, screen means extending transversely across said container intermediate its height to separate said upper area and said lower area, said screen means being constructed to retain the pieces of charcoal upon it and in said upper area, a quantity of granular extinguishing material normally disposed in said lower area and comprising grains sufficiently small to pass through said screen means, and frame means pivotally supporting said container at an elevated position for inversion, whereby the charcoal is extinguished by inverting the container so that the granular material passes through the screen means into the upper area, and the charcoal and the granular material are separated by again inverting the container so that the granular material passes through the screen means into the lower area.

4. Apparatus for extinguishing burning but only partially consumed pieces of charcoal, said apparatus comprising a closed container having a first area for pieces of charcoal and a second area for granular extinguishing material, means defining an access door to said first area for inserting and removing the pieces of charcoal, means defining a perforated separator between said first area and said second area for retaining the pieces of charcoal in said first area, while permitting the granular extinguishing material to pass through said perforated separation, and frame means supporting said container for movement between a first position where said first area is generally above said second area and a second position where said second area is generally at least as high as said first area, whereby the charcoal is extinguished by reorienting the container to the second position where the granular material passes through the separator into the first area and the charcoal and granular material are separated by again reorienting the container to the first position where the granular material passes through the separator into the second area.

5. An apparatus for extinguishing burning but only partially consumed pieces of charcoal and the like, said apparatus comprising a closed container having an upper area for pieces of charcoal and a lower area disposed generally below said upper area for granular extinguishing material, means defining an access door to said upper area for inserting and removing the pieces of charcoal, screen means extending transversely across said container intermediate its height to separate said upper area and said lower area, said screen means being constructed to retain the pieces of charcoal upon it and in said upper area while permitting the granular extinguishing material to pass through said screen means, and frame means pivotally supporting said container in an elevated position for inversion, whereby the charcoal is extinguished by inverting the container so that the granular material passes through the screen means into the upper area, and the charcoal and granular material are separated by again inverting the container so that the granular material passes through the screen means into the lower area.

6. A self-standing portable apparatus for extinguishing burning but only partially consumed pieces of charcoal and the like, said apparatus comprising a closed container having an upper area for pieces of charcoal and a lower area disposed generally below said upper area for granular extinguishing material, means defining an access door to said upper area for inserting and removing the pieces of charcoal, screen means extending transversely across said container intermediate its height to separate said upper area and said lower area, said screen means being constructed to retain the pieces of charcoal upon it and in said upper area while permitting the granular extinguishing material to pass through said screen means, and self-standing frame means pivotally supporting said container in an elevated position for inversion and including handle means for moving said apparatus from place to place, whereby the charcoal is extinguished by inverting the container so that the granular material passes through the screen means into the upper area, and the charcoal and granular material are separated by again inverting the container so that the granular material passes through the screen means into the lower area.

7. A self-standing portable unit for extinguishing burning but only partially consumed pieces of charcoal and the like so that the pieces may be subsequently reused, said unit comprising, in combination: a closed imperforate container having a tubular vertical side wall, a lower end wall, and an upper end wall, means releasably supporting said upper end wall on said side wall for selective opening and closing of said upper end wall to afford access to the interior of said container, a screen mounted in said container and extending generally horizontally across said container intermediate said end walls for supporting pieces of charcoal and the like, and support frame means including a self-standing frame and pivot means between said frame and the side wall of said container for pivotally supporting said container in an elevated position and permitting said container to be inverted on said pivot means to a reversed generally upside down position, whereby granular extinguishing material in the container below the screen engulfs the burning pieces and extinguishes them when the container is so reversed, and the extinguishing material again passes through the screen when the container is turned right side up to automatically separate the extinguishing material from the charcoal.

8. Apparatus for extinguishing burning but only partially consumed pieces of charcoal, said apparatus comprising a closed container having a first area for pieces of charcoal and a second area for granular extinguishing material, means defining an access door to said first area for inserting and removing the pieces of charcoal, means defining a perforated separator between said first area and said second area in the form of a removable screen basket with carrying handles for retaining the pieces of charcoal in said first area, while permitting the granular extinguishing material to pass through said perforated separator, whereby the charcoal is extinguished by reorienting the container so that the granular material passes through the separator into the first area and the charcoal and granular material are separated by again reorienting the container so that the granular material passes through the separator into the second area.

9. An apparatus for broiling food, the combination of a receptacle for holding pieces of solid fuel during their combustion; means defining an outlet through the bottom of said receptacle, door means on said receptacle for selectively opening and closing said outlet, frame means supporting said receptacle elevated above the ground, and an invertible closed container pivotally mounted on said frame means in position below said receptacle, said container having means defining an inlet normally positioned below said outlet and having a latchable cover means for selectively opening and closing said inlet, said container also including screen means extending across the inside of said container intermediate its height to separate the lower portion of said container, which is adapted to hold a quantity of a granular extinguishing material, from said inlet.

10. A method for extinguishing burning but only partially consumed pieces of charcoal or the like so that the pieces can be subsequently reused, said method comprising the steps of:
 (a) mixing a quantity of burning charcoal pieces with a quantity of nonflammable granular extinguishing material such as sand so as to substantially cover all of the pieces of charcoal and maintaining the resultant mixture in substantially this condition for sufficient time to extinguish the pieces of charcoal.
 (b) placing the mixture of granular material and extinguished charcoal pieces on a porous support which will hold the pieces of charcoal and permit the granular material to pass through the support, and
 (c) removing the extinguished pieces of charcoal from the support.

11. A method for extinguishing burning but only partially consumed pieces of charcoal or the like so that the pieces can be subsequently reused, said method comprising the steps of:
 (a) mixing a quantity of burning charcoal pieces with a quantity of nonflammable granular extinguishing material such as sand so as to substantially cover all of the pieces of charcoal and maintaining the resultant mixture in substantially this condition for sufficient time to extinguish the pieces of charcoal,
 (b) agitating the mixture,
 (c) placing the mixture on a porous support which will hold pieces of charcoal and permit the granular material as well as ashes and small particles from the charcoal pieces to pass through the support, and
 (d) removing the extinguished pieces of charcoal from the support.

12. Apparatus as called for in claim 5, but where a portion of said container which supports the burning charcoal when the container is inverted is formed with a spaced double-wall to minimize the temperature at the outer surface of said portion.

References Cited by the Examiner
UNITED STATES PATENTS

| | | | |
|---|---|---|---|
| 1,107,066 | 8/1914 | Heim | 220—22 |
| 2,814,263 | 11/1957 | Parrish | 126—245 X |
| 3,126,881 | 3/1964 | Blotsky | 126—245 X |

FREDERICK KETTERER, *Primary Examiner.*